United States Patent
Johnson et al.

(10) Patent No.: US 7,556,224 B2
(45) Date of Patent: Jul. 7, 2009

(54) DISTRIBUTED FLIGHT CONTROL SURFACE ACTUATION SYSTEM

(75) Inventors: Andrew T. Johnson, Scottsdale, AZ (US); Casey Hanlon, Queen Creek, AZ (US); Calvin C. Potter, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 630 days.

(21) Appl. No.: 11/319,869

(22) Filed: Dec. 27, 2005

(65) Prior Publication Data

US 2007/0145180 A1 Jun. 28, 2007

(51) Int. Cl.
*B64C 13/50* (2006.01)

(52) U.S. Cl. ............ 244/175; 244/99.2; 244/76 A; 701/3

(58) Field of Classification Search ............ 244/175, 244/76 A, 221, 99.2, 99.3, 99.4, 13, 211, 244/212, 214, 215, 216; 701/3, 4
See application file for complete search history.

(56) References Cited

U.S. PATENT DOCUMENTS

| | | | |
|---|---|---|---|
| 2,403,577 A | 7/1946 | Breitwieser | |
| 2,658,701 A | 11/1953 | Robertson | |
| 3,106,903 A | 10/1963 | Bentkowsky et al. | |
| 3,640,150 A | 2/1972 | Leiner et al. | |
| 3,841,589 A | 10/1974 | Appleby et al. | |
| 3,940,094 A | 2/1976 | Kress et al. | |
| 4,191,347 A | 3/1980 | Fueyo | |
| 4,579,201 A | 4/1986 | Tiedeman | |
| 4,779,822 A | 10/1988 | Burandt et al. | |
| 4,800,798 A | 1/1989 | Boldrin et al. | |
| 4,964,599 A | 10/1990 | Farineau | |
| 5,686,907 A | 11/1997 | Bedell et al. | |
| 5,740,991 A * | 4/1998 | Gleine et al. | 244/203 |
| 5,743,490 A | 4/1998 | Gillingham et al. | |
| 6,739,550 B2 | 5/2004 | Koizumi et al. | |
| 6,860,452 B2 * | 3/2005 | Bacon et al. | 244/194 |
| 7,048,234 B2 * | 5/2006 | Recksiek et al. | 244/213 |
| 7,051,975 B2 * | 5/2006 | Pohl et al. | 244/99.4 |

(Continued)

FOREIGN PATENT DOCUMENTS

EP 0573106 A1 5/1993

(Continued)

OTHER PUBLICATIONS definition of "selective" at www.dictionary.com.*

(Continued)

*Primary Examiner*—Michael Carone
*Assistant Examiner*—Benjamin P Lee
(74) *Attorney, Agent, or Firm*—Ingrassia Fisher & Lorenz, P.C.

(57) ABSTRACT

An aircraft flight control surface actuation system includes a plurality of flap actuators, and a plurality of slat actuators. The actuators receive actuator position commands from an actuator control unit and, in response, move flaps and slats between stowed and deployed positions. The flight control surface actuator control unit includes a plurality of independent actuator control channels. One or more of the independent actuator control channels is coupled to both a flap actuator and a slat actuator, and is configured to selectively supply the actuator position commands thereto.

17 Claims, 4 Drawing Sheets

U.S. PATENT DOCUMENTS

| | | | |
|---|---|---|---|
| 7,366,592 B2 * | 4/2008 | Delaplace et al. | 701/4 |
| 2004/0200928 A1 | 10/2004 | Degenholtz et al. | |
| 2005/0029407 A1 | 2/2005 | Pohl et al. | |
| 2005/0151027 A1 | 7/2005 | Recksieck et al. | |
| 2006/0043242 A1 * | 3/2006 | Benson | 244/175 |
| 2006/0289696 A1 * | 12/2006 | Hanlon et al. | 244/35 R |
| 2007/0108343 A1 * | 5/2007 | Wingett et al. | 244/99.3 |

FOREIGN PATENT DOCUMENTS

EP  1785347 A2  11/2006

OTHER PUBLICATIONS

European search report, EP 06126591.4 dated Apr. 17, 2008.

* cited by examiner ered with a flap actuator via suitable gears and either torque tubes or flexible shafts. Some flight control surface actuation systems similarly include a central slat power drive unit that drives each of the slat actuators via a plurality of gears and either torque tubes or flexible shafts. Alternatively, some flight control surface actuation systems include individual power drive units that individually drive each of the flap and or slat actuators.

DISTRIBUTED FLIGHT CONTROL SURFACE ACTUATION SYSTEM

TECHNICAL FIELD

The present invention relates to flight surface actuation and, more particularly, to a distributed flight surface actuation system for aircraft flaps and slats.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Though unlikely, it is postulated that a flight control surface actuator could become inoperable. Thus, some flight control surface actuation systems are implemented with a plurality of actuators coupled to a single flight control surface.

In many flight control surface actuation systems, the flap actuators and the slat actuators are each driven via a central power drive unit and mechanical drive trains. For example, many flight control surface actuation systems include a central flap power drive unit that drives each of the flap actuators via a plurality of gears and either torque tubes or flexible shafts. Some flight control surface actuation systems similarly include a central slat power drive unit that drives each of the slat actuators via a plurality of gears and either torque tubes or flexible shafts. Alternatively, some flight control surface actuation systems include individual power drive units that individually drive each of the flap and or slat actuators.

The flight control surface actuation systems that use central flap and slat drive units, or that use individual flap and slat actuator power drive units, are generally safe, reliable, and robust. However, these systems do suffer certain drawbacks. Namely, these systems can be relatively complex, can involve the use of numerous parts, and can be relatively heavy. Moreover, the flight control surface actuation systems that use individually driven flap and slat actuators typically rely on numerous controllers, such as one per actuator or flight control surface, which can further increase complexity and weight.

Hence, there is a need for a flight control surface actuation system that is less complex and/or uses less components and/or is lighter than current systems that are used to drive the aircraft flap and slat actuators. The present invention addresses one or more of these needs.

BRIEF SUMMARY

The present invention provides a relatively lightweight, less complex flight control surface actuation system for aircraft flaps and slats.

In one embodiment, and by way of example only, a flight control surface actuation system for aircraft having a plurality of flaps and slats on an aircraft wing includes a plurality of flap actuators, a plurality of slat actuators, and a flight control surface actuator control unit. Each flap actuator is coupled to receive actuator position commands and is operable, in response thereto, to move a flap to a commanded flap position. Each slat actuator is coupled to receive actuator position commands and is operable, in response thereto, to move a slat to a commanded slat position. The flight control surface actuator control unit includes a plurality of independent actuator control channels. One or more of the independent actuator control channels is coupled to both a flap actuator and a slat actuator, and is configured to selectively supply the actuator position commands thereto.

In another exemplary embodiment, a flight control surface actuation system for aircraft having a first wing, a second wing, and plurality of flaps and slats on each wing includes a plurality of first flap actuators, a plurality of second flap actuators, a plurality of first slat actuators, a plurality of second slat actuators, a first flight control surface actuator control unit, and a second flight control surface actuator controller. Each of the first flap actuators is coupled to receive actuator position commands and is operable, in response thereto, to move a flap on the first wing to a commanded flap position. Each of the second flap actuators is coupled to receive actuator position commands and is operable, in response thereto, to move a flap on the second wing to a commanded flap position. Each of the first slat actuators is coupled to receive actuator position commands and is operable, in response thereto, to move a slat on the first wing to a commanded slat position. Each of the second slat actuators is coupled to receive actuator position commands and is operable, in response thereto, to move a slat on the second wing to a commanded slat position. The first flight control surface actuator control unit includes a plurality of independent actuator control channels. One or more of the independent actuator control channels is coupled to both a first flap actuator and a first slat actuator, and is configured to selectively supply the actuator position commands thereto. The second flight control surface actuator control unit includes a plurality of independent actuator control channels. One or more of the independent actuator control channels is coupled to both a second flap actuator and a second slat actuator, and is configured to selectively supply the actuator position commands thereto.

In yet another exemplary embodiment, a method of moving a plurality of leading edge and trailing edge flight control surfaces of an aircraft, in which the leading edge flight control surfaces are disposed along a leading edge of an aircraft wing and include at least an inboard flight control surface and an outboard flight control surface, and the trailing edge flight control surfaces are disposed along a trailing edge of the aircraft wing and include at least an inboard flight control surface and an outboard flight control surface, includes the steps of sequentially moving the inboard and outboard leading edge flight control surfaces, and sequentially moving the inboard and outboard trailing edge flight control surface.

Other independent features and advantages of the preferred flight control surface actuation system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1A:
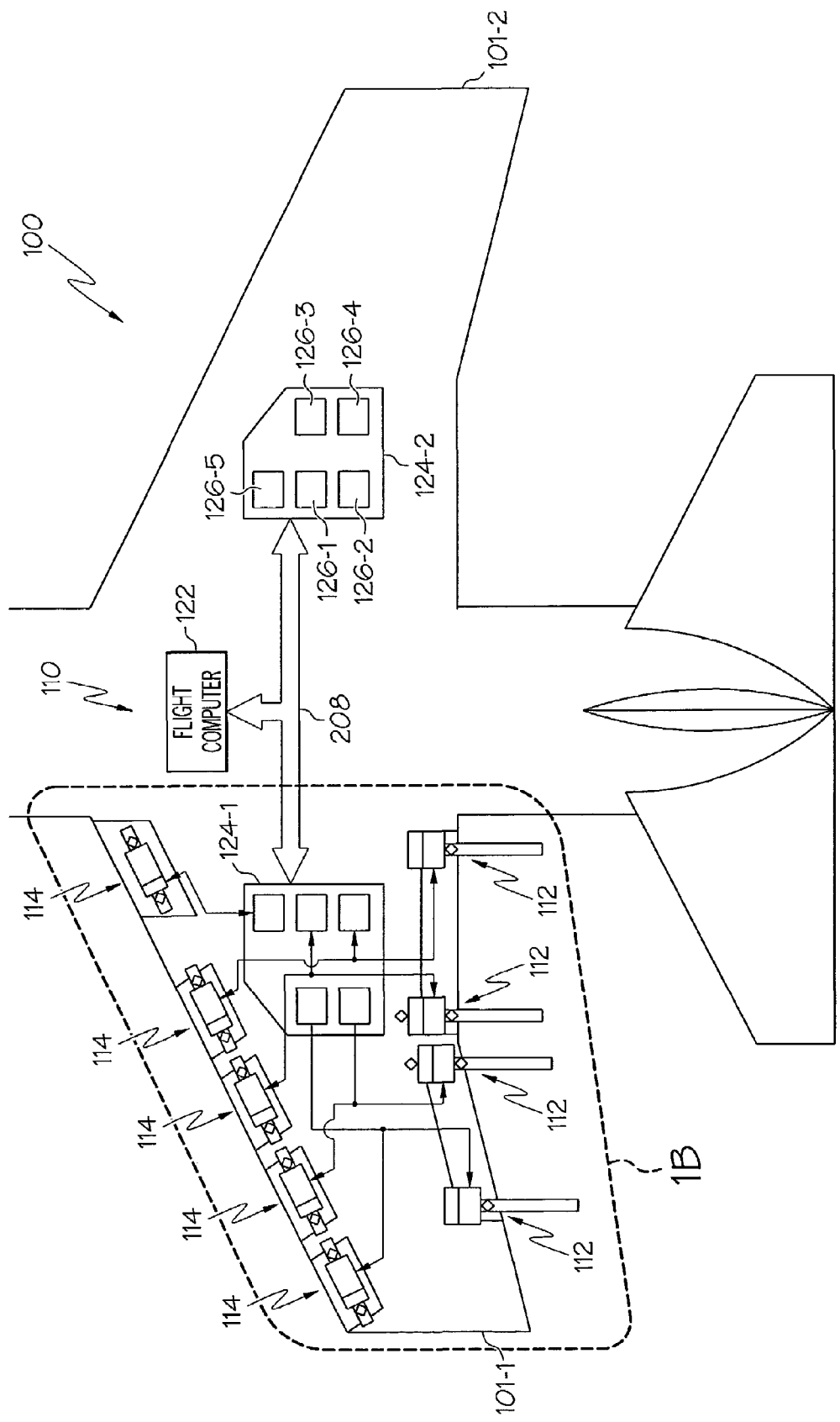
FIGS. 1A and 1B are schematic diagrams of a portion of an exemplary aircraft and a close-up view of a wing of the exemplary aircraft, respectively, depicting an exemplary embodiment of a flight control surface actuation system for aircraft flaps and slats.
Figure 1B:
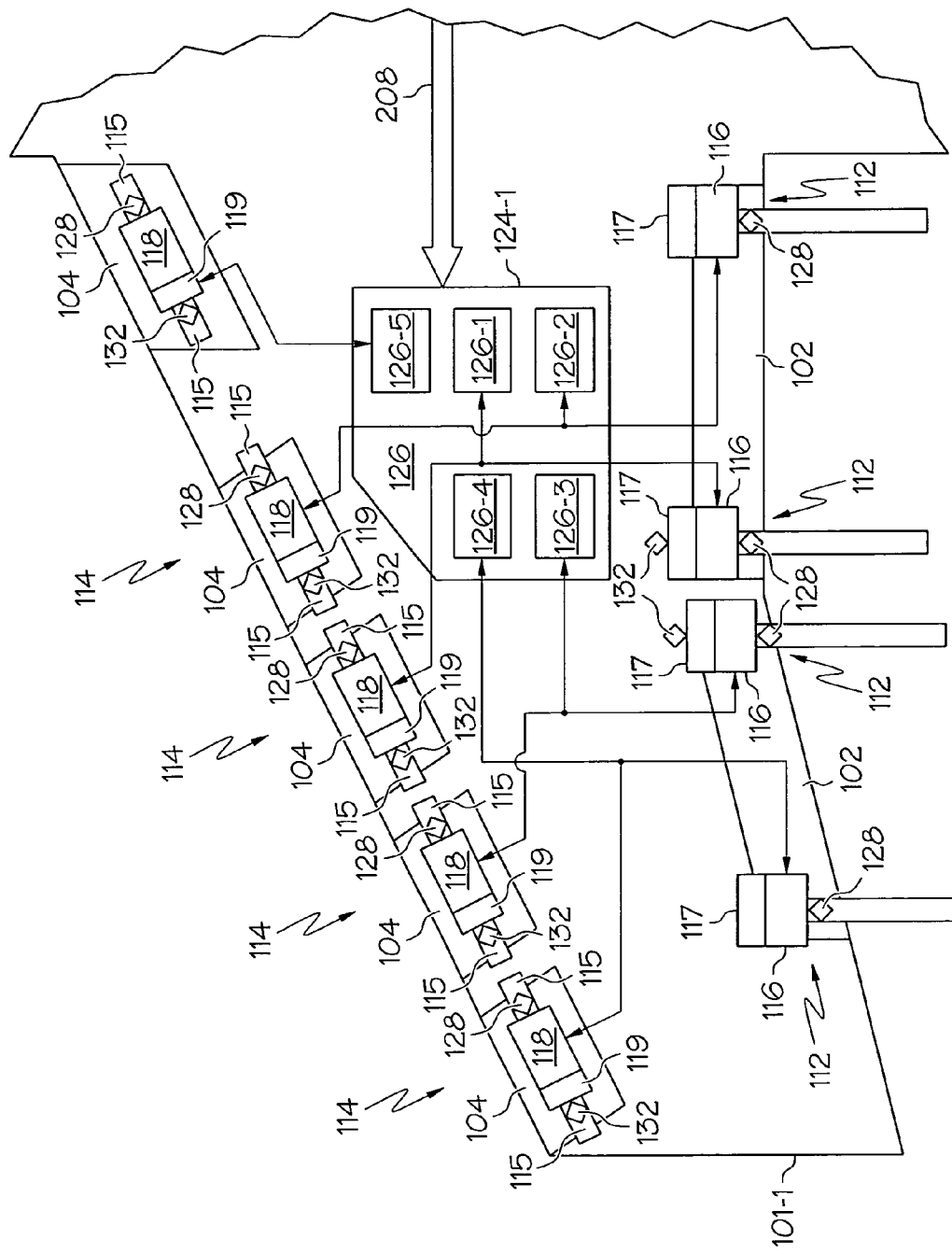

Turning first to FIGS. 1A and 1B, a schematic diagram of a portion of an exemplary aircraft 100 depicting an exemplary embodiment of a flight control surface actuation system 110 for aircraft flaps and slats is provided. The aircraft 100 includes a plurality of trailing edge flight control surfaces 102 and a plurality of leading edge flight control surfaces 104 on each wing 101 (101-1, 101-2). In particular, a plurality of flaps 102 are disposed the trailing edge of each wing 101, and a plurality of slats 104 are disposed on the leading edge of each wing 101. Though not included in the depicted embodiment, it will be appreciated that one of the leading edge flight control surfaces 104 on each wing 101 could also be implemented as a flap. This flight control surface, if included, is sometimes referred to as a Krueger flap. It will be appreciated that the aircraft 100 will typically include various primary flight control surfaces, and may additionally include various other secondary control surfaces, such as spoilers. However, for clarity and ease of illustration and description, these other control surfaces are not depicted or further described. It will additionally be appreciated that, for added clarity, the flaps 102, slats 104, and associated electrical interconnections are shown only for one wing 101-1.

The flaps 102 and slats 104 are high-lift devices that influence the lift and drag of the aircraft 100. For example, during aircraft take-off and landing operations, when increased lift is desirable, the flaps 102 and slats 104 may be moved from stowed positions to deployed positions. In the deployed position, the flaps 104 increase both lift and drag, and enable the aircraft 100 to descend more steeply for a given airspeed, and also enable the aircraft 100 become airborne over a shorter distance. The slats 104, in the deployed position, increase lift, and are typically used in conjunction with the flaps 102.

The flaps 102 and slats 104 are moved between the stowed and deployed positions via the flight control surface actuation system 110. The flight control surface actuation system 110 includes a plurality of flap actuators 112, which are used to move the flaps 104, and a plurality of slat actuators 114, which are used to move the slats 104. The flight control surface actuation system 110 may be implemented using various numbers and types of flap and slat actuators 112, 114. In addition, the number and type of flap and slat actuators 112, 114 per control surface 102, 104 may be varied. In the depicted embodiment, the system 110 is implemented such that two flap actuators 112 are coupled to each flap 102, and one slat actuator 114 is coupled to each slat 104. Moreover, each flap actuator 112 is preferably implemented using a linear-type actuator, such as, for example, a ballscrew actuator, and each slat actuator 114 is preferably implemented using a rotary-type actuator. In the depicted embodiment, the slat actuators 114 additionally include torque tubes 115, which couple the drive force supplied by the actuators 114 to the slats 104. It will be appreciated that this number and type of flap actuators 112 and this number and type of slat actuators 114 is merely exemplary of a preferred embodiment, and that other numbers and types of actuators 112, 114 could also be used.

The actuators 112, 114 are each driven by one or more actuator drive units 116, 118, respectively, and are each lock in place by one or more brakes 117, 119, respectively. Preferably, as is shown most clearly in FIG. 1B, one actuator drive unit 116 is associated with each flap actuator 112, and one actuator drive unit 118 is associated with each slat actuator 114. The flap and slat actuator drive units 116, 118 each receive actuator position commands and, in response, rotate in one direction or another, to thereby supply a drive force to its associated flap actuator 112 or slat actuator 114. The flap and slat actuators 112, 114 are each coupled to receive the drive force supplied from its associated actuator drive unit 116, 118 and, depending on the direction in which the actuator drive units 116, 118 rotate, move between stowed and deployed positions, to thereby move the flaps 102 and slats 104 between stowed and deployed positions. It will be appreciated that the actuator drive units 116, 118 may be implemented as any one of numerous types of drive units including, for example, hydraulic motors, pneumatic motors, or electric motors. In the preferred embodiment, however, the actuator drive units 116, 118 are electric motors, and may be implemented as any one of numerous types of AC or DC motors. Preferably, however, the actuator drive units 116, 118 are implemented as brushless DC motors.

The flight control surface actuation system 110 additionally includes one or more flight computers 122 (only one shown), and a plurality of actuator control units 124. The flight computer 122 receives commands, from either the pilot or an autopilot, and, in response, supplies flight control surface position commands to the actuator control units 124. In response to the flight control surface position commands, the actuator control units 124 selectively supply actuator position commands to the actuator drive units 116, 118. The actuator drive units 116, 118, in response to the actuator position commands, drive the flap and slat actuators 112, 114 to the commanded flap and slat positions, respectively.

Figure 2:
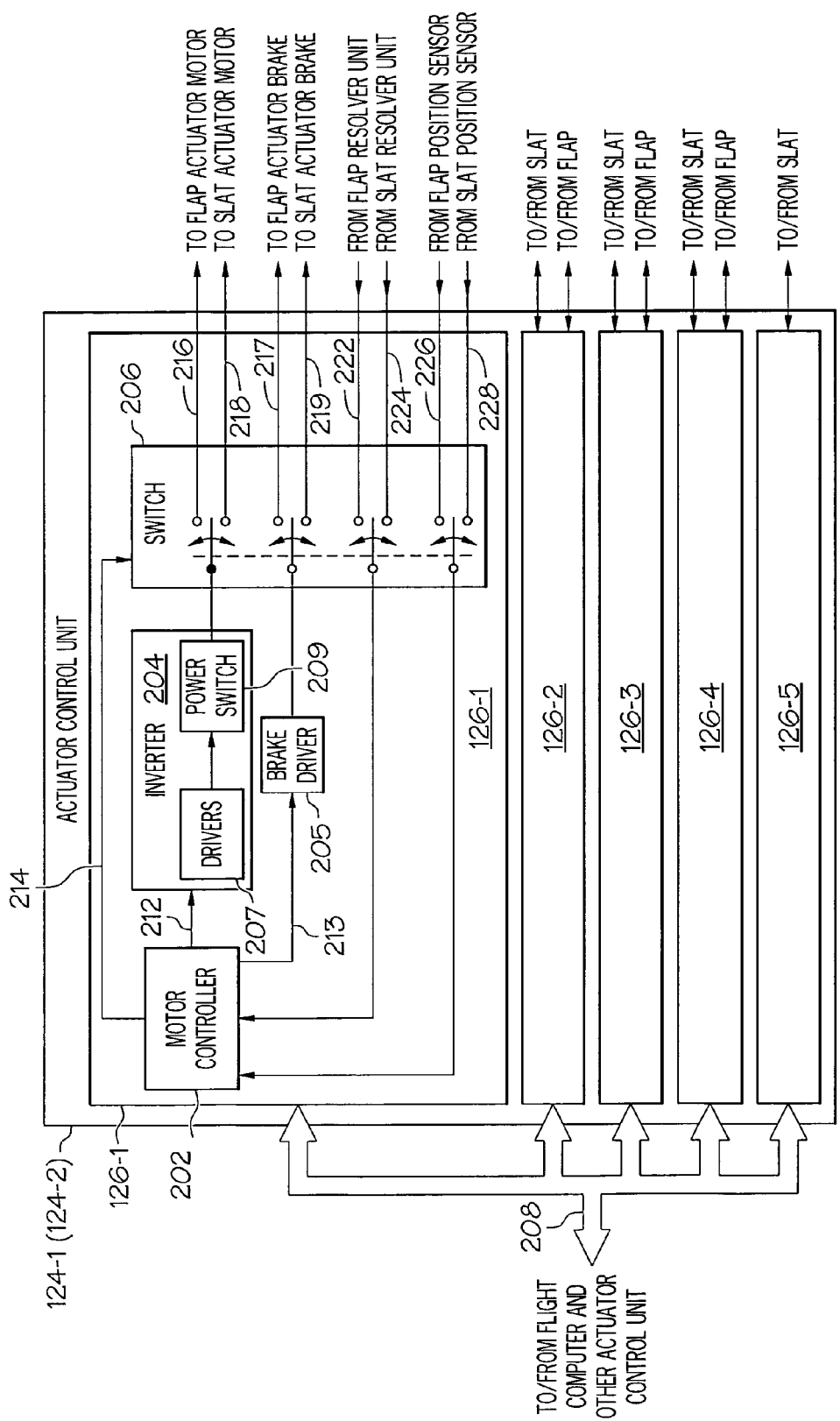
FIG. 2 is a functional schematic block diagram of an exemplary actuator control unit that may be used in the exemplary flight control surface actuation system that is partially shown in FIG. 1.

It will be appreciated that the number and configuration of actuator control units 124 may vary. However, the flight control surface actuation system 110 preferably includes two multi-channel actuator control units 124-1, 124-2. The actuator control units 124 are configured such that one of the actuator control units 124-1 controls the flap and slat actuators 112, 114 on one wing 101-1, and the other actuator control unit 124-2 controls the flap and slat actuators 112, 114 on the other wing 101-2. Although the number and configuration of actuator control channels in each actuator control unit 124 may vary, it will be appreciated that each actuator control unit 124 preferably includes one independent actuator control channel 126 for each flap actuator/slat actuator pair, plus any additional actuator control channels 126 that may be needed. Thus, for the embodiment depicted in FIGS. 1A and 1B, each actuator control unit 124 includes five independent actuator control channels 126 (e.g., 126-1, 126-2, 126-3, 126-4, 126-5). In particular, four of the independent actuator control channels 126-1 through 126-4 are each independently coupled to both a flap actuator 112 and to a slat actuator 114, and one of the independent actuator control channels 126-5 is coupled to only a slat actuator 114. A functional block diagram of an exemplary embodiment of one of the actuator control units 124, showing one of the actuator control channels 126-1 in more detail, is depicted in FIG. 2 and will be described in more detail. Before doing so, however, it will be appreciated that the embodiment depicted in FIG. 2 is representative of an exemplary embodiment that is used when the power drive units 116, 118 are implemented as electric motors, and that the architecture of the actuator control units 124 will vary when the power drive units 116, 118 are implemented as hydraulic motors or pneumatic motors.

Turning now to FIG. 2, it is seen that the independent actuator control channels 126 each include a motor controller 202, an inverter 204, and a brake driver 205. Moreover, each control channel 126 that is coupled to both a flap actuator 112 and to a slat actuator 114 (e.g., 126-1 through 126-4 in the depicted embodiment) additionally includes a switch 206. The motor controllers 202 are each coupled to receive flight control surface position commands from, and to supply position feedback signals to, the flight computer 122 and to the other actuator controller 124 via, for example, a communication and power bus 208. The motor controllers 202, in response to the flight control surface position commands, supply inverter commands 212, brake release commands 213, and actuator switch commands 214. The inverter commands 212 that each motor controller 202 supplies will depend, for example, on the particular control law being implemented. The particular control law that a motor controller 202 is implementing may vary depending, for example, on the particular flight control surface 102, 104 that the actuator control channel 126 is controlling. For example, the control law used to implement position control of a flap 112 may differ from that used to implement position control of a slat 114. It will be appreciated that the motor controllers 202 may be implemented using analog circuit components, programmable logic devices, one or more processors, or various combinations of these or other circuit elements. It will additionally be appreciated that the control law(s) that the motor controllers 202 implement may be hardware based or embedded or otherwise stored in a local memory.

The motor controllers 202 supply the inverter commands 212 to the inverters 204 in the same channel 126. In the depicted embodiment, the inverters 204 each include a plurality of drivers 207 and power switches 209. The drivers 207, in response to the inverter commands 212, control the power switches 209 in such a manner that the inverter 204 converts DC power, which is supplied to the actuator control units 124 via the communication and power bus 208, to AC power. The AC power is in turn supplied as actuator position commands 216, 218, to the actuator drive units 116, 118, respectively. It will be appreciated that this is merely exemplary, and that the actuator position commands supplied to the actuator drive units 116, 118 could be DC power signals, rather than AC power signals. Thus, the actuator control units 124 could be implemented, in some embodiments, without the inverters 204. It will additionally be appreciated that the inverters 204 would not be included in those embodiments in which the power drive units 116, 118 are hydraulically powered or pneumatically powered.

The motor controllers 202 additionally supply the brake release commands 213 to the brake drivers 205 in the same channel 126. The brake drivers 205 in turn supply suitable brake release signals 217, 219 to the brakes 117, 119, respectively, depending on the position of the switch 206.

As was noted above, selected ones of the independent control channels 126, and more specifically each of the independent control channels 126 that are coupled to both a flap actuator 112 and a slat actuator 114, includes a switch 206. The switches 206 are responsive to the switch commands 214 supplied from its associated motor controller 202 to selectively couple the actuator position commands 216 or 218, and brake release signals 217 or 219, to either a flap actuator 112 or a slat actuator 114, respectively. It will be appreciated that the switches 206 may be implemented using any one of numerous types of switch elements. For example, the switches 206 may be implemented as relays or various types of electronic switches, just to name a few.

The switches 206 additionally couple, depending on the commanded switch position, feedback signals from either the flap or slat actuators 112, 114 to the motor controller 202. The feedback signals include a drive unit position and speed signal 222 or 224, which is representative of the rotational position and speed of the drive unit 116 or 118. The feedback signals may additionally include an actuator position signal 226 or 228, which is representative of actuator 102 or 104 position, which is in turn representative of the position of the flight control surface 112 or 114 to which the associated actuator 102 or 104 is coupled. Thus, with reference once again to FIG. 1, it is seen that each actuator drive unit 116, 118 preferably includes a resolver unit 128. Moreover, at least one of the flap actuators 112 coupled to each flap, and each slat actuator 114, preferably include an actuator position sensor 132. The resolver units 128 sense the rotational position and speed of the drive units 116, 118 and supply the drive unit position and speed signals 222, 224 to the motor controllers 202. The actuator position sensors 132 sense the position of the actuators 112, 114 and supply the actuator position signals 226, 228 to the motor control circuits 202. It will be appreciated that the actuator position sensors 132 may be implemented using any one of numerous types of sensors including, for example, linear variable differential transformers (LVDTs), rotary variable differential transformers (RVDTs), Hall effect sensors, or potentiometers, just to name a few.

No matter the particular type of actuator position sensor 128 that is used, the motor controllers 202 are preferably configured to compare the motor position and speed signals 222, 224 and the actuator position signals 226, 228 to the control surface position commands and, implementing the appropriate control law, to supply updated inverter commands 212, as needed, to the inverters 204. In addition, the position and speed signals 222, 224 and the actuator position signals 226, 228 from one actuator controller 124-1 (124-2) are, as noted above, supplied to the other actuator control unit 124-2 (124-1) so that the actuators 112, 114 coupled to symmetric flight control surfaces 102, 104, and thus the symmetric flight control surfaces 102, 104 themselves, move at about the same time and at about the same rate.

In addition to, or instead of, using the actuator position signals 226, 228 to synchronize the drive units 116, 118 and/or determine flap 112 or slat 114 position, the system 110 may include a plurality of flap position sensors and/or a plurality of slat position sensors. For example, one or more flap position sensors could be coupled to each of the flaps 112, and one or more slat position sensors could be coupled to each of the slats 114. The flap and slat position sensors, if included, are configured to sense flap and slat positions, respectively, and supply flap and slat position signals representative thereof, respectively, to the appropriate motor controllers 202 in the appropriate actuator control units 124-1, 124-2. The flap and slat position sensors, if included, may be implemented using any one of numerous types of sensors including, for example, linear variable differential transformers (LVDTs), rotary variable differential transformers (RVDTs), Hall effect sensors, or potentiometers, just to name a few.

The flight computer 122, upon receipt of commands from either the pilot or autopilot, issues flight control surface position commands to the actuator control units 124-1, 124-2. The actuator control channels 126 in each actuator control unit 124-1, 124-2 respond to the flight control surface position commands and supply actuator position commands to either a flap actuator 112 or a slat actuator 114, to either move either a flap 102 or a slat 104. More specifically, if the flight control surface position commands are flap position commands, then the motor controllers 202 in the appropriate control channels 126 will generate the appropriate inverter commands 212, brake release commands 213, and switch commands 214, to release the appropriate brakes 117 and to supply actuator position commands to the appropriate flaps 102. Similarly, if the flight control surface position commands are slat position commands, then the motor controllers 202 in the appropriate control channels 126 will generate the appropriate inverter commands 212, brake release commands 213, and switch commands 214, to release the appropriate brakes 119 and to supply actuator position commands to the appropriate slats 104. If, however, the flight control surface position commands include both flap and slat position commands, then the motor controllers 202 in the appropriate control channels will generate the appropriate inverter commands 212, brake release commands 213, and switch commands 214, to sequentially release the flap brakes 117 and slat brakes 119, and to sequentially supply actuator position commands to the flaps 102 and slats 104. For example, the motor controllers 202 in each channel could be configured such that the leading edge surfaces 104 (e.g., the slats) are positioned first, followed by the trailing edge surfaces 102 (e.g., the flaps), or vice-versa.

Figure 3:
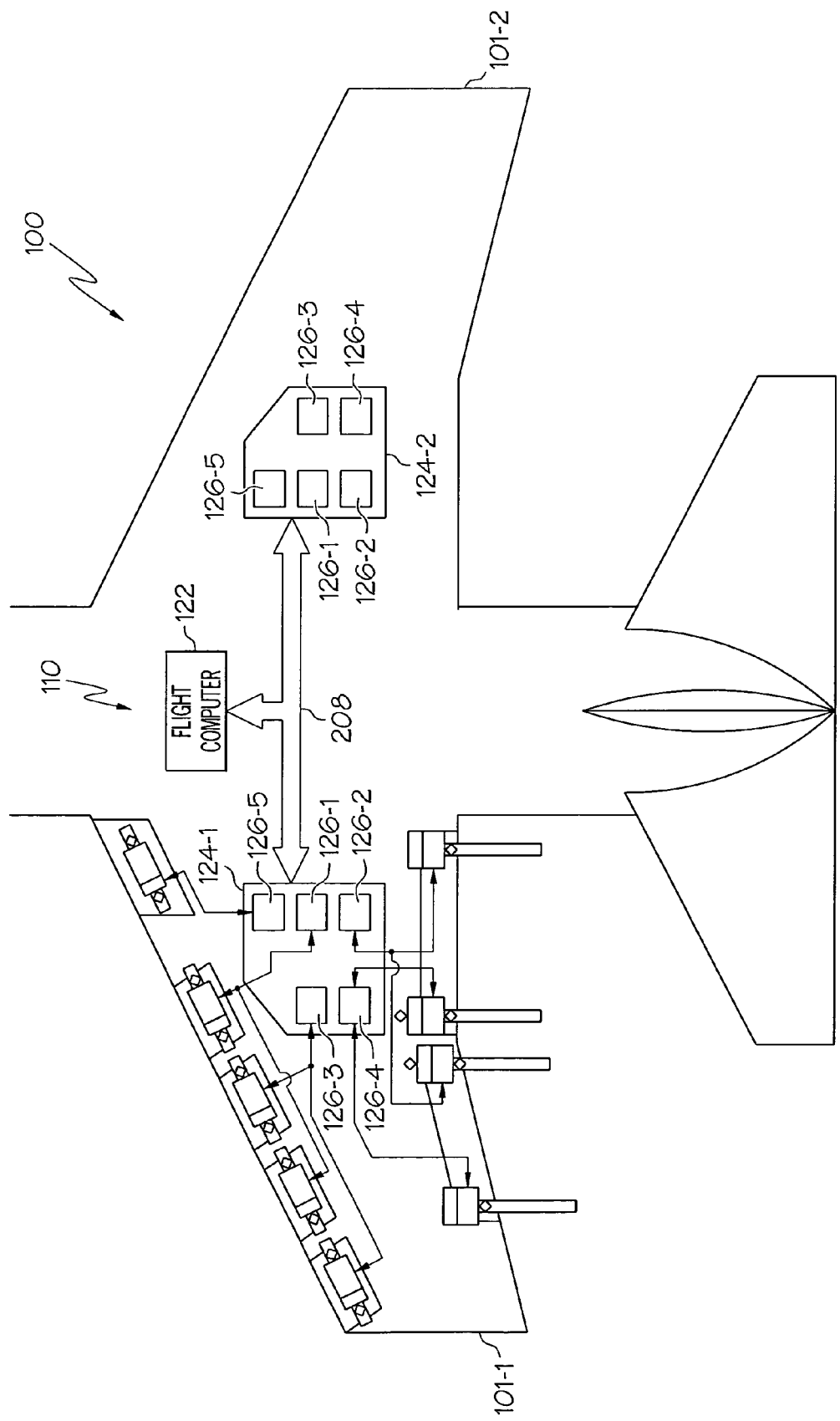
FIG. 3 is a schematic diagram the exemplary aircraft of FIG. 1, depicting another exemplary alternative embodiment of a flight control surface actuation system for aircraft flaps and slats.

It will be further appreciated that the actuator control units 124 could be configured to implement a different flight control surface position sequence than the one just mentioned. For example, and as shown more clearly in FIG. 3, the actuator control units 124 could be configured such that, when the flight control surface position commands include both flap and slat position commands, the actuator controllers 124 simultaneously move selected pairs of flap actuators and slat actuator 102, 104. More specifically, the motor controllers 202 in the appropriate control channels 126 will generate the appropriate inverter commands 212 and switch commands 214 to sequentially supply actuator position commands such that the inboard flaps 102 and slats 104 are simultaneously positioned first, and the outboard flaps 102 and slats 104 are positioned last. It will be appreciated that with this latter embodiment, any interposing flaps 102 and/or slats 104 would additionally be sequentially positioned, with the relatively inboard surfaces 102, 104 being positioned before the relatively outboard surfaces 102, 104.

The flight control surface actuation systems 110 described above and depicted in FIGS. 1-3 reduce the number of drive unit controllers as compared to presently known systems. As a result, the systems 110 are relatively less complex, easier to implement, and lighter in weight as compared to most current systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A flight control surface actuation system for aircraft having a plurality of flaps and slats on an aircraft wing, the system comprising:
   a plurality of flap actuators, each flap actuator coupled to receive actuator position commands and operable, in response thereto, to move a flap to a commanded flap position;
   a plurality of slat actuators, each slat actuator coupled to receive actuator position commands and operable, in response thereto, to move a slat to a commanded slat position; and
   a flight control surface actuator control unit including a plurality of independent actuator control channels, one or more of the independent actuator control channels (i) coupled to both a flap actuator and a slat actuator and (ii) configured to selectively supply the actuator position commands thereto.

2. The system of claim 1, wherein the one or more independent actuator control channels each comprise a switch operable to selectively couple the actuator position commands to either the flap actuator or the slat actuator.

3. The system of claim 1, wherein:
   at least two flap actuators are coupled to a single flap; and
   one slat actuator is coupled to a single slat.

4. The system of claim 1, wherein the flight control surface actuator control unit is adapted to receive flight control surface position commands and is operable, in response thereto, to sequentially supply the actuator position commands to thereby sequentially move the slat actuators and the flap actuators to the commanded slat positions and flap positions, respectively.

5. The system of claim 1, wherein:
   the plurality of slat actuators include at least an inboard slat actuator and an outboard slat actuator to thereby move an inboard slat and an outboard slat, respectively, to the commanded slat position;
   the plurality of flap actuators include at least an inboard flap actuator and an outboard flap actuator to thereby move an inboard flap and an outboard flap, respectively, to the commanded flap position; and
   the actuator control unit is adapted to receive flight control surface position commands and is operable, in response thereto, to sequentially supply the actuator position commands to the inboard and outboard slat actuators and to the inboard and outboard flap actuators, to thereby sequentially move the inboard and outboard slats to the commanded slat position and sequentially move the inboard and outboard flaps to the commanded flap position.

6. The system of claim 1, further comprising:
   a plurality of slat position sensors, each slat position sensor operable to supply a slat position signal representative of one the slats; and
   a plurality of flap position sensors, each flap position sensor operable to supply a flap position signal representative of one of the flaps.

7. The system of claim 6, wherein:
each slat position sensor comprises a slat actuator position sensor operable to sense a position of a slat actuator and, in response, supply the slat position signal; and
each flap position sensor comprises a flap actuator position sensor operable to sense a position of a flap actuator and, in response, supply the flap position signal.

8. The system of claim 6, wherein:
each slat position sensor is coupled to a slat and is operable to sense the position thereof and supply the slat position signal; and
each flap position sensor is coupled to a flap and is operable to sense the position thereof and supply the flap position signal.

9. The system of claim 1, wherein:
each flap actuator is a linear electromechanical actuator having an electric motor; and
each slat actuator is a rotary electromechanical actuator having an electric motor.

10. The system of claim 1, further comprising:
a plurality of motor resolvers, each motor resolver coupled to one of the electric motors and operable to sense a rotational position thereof and supply a motor rotational position signal representative thereof.

11. The system of claim 10, wherein:
each of the electric motors is a brushless DC motor; and
the control unit is coupled to receive the motor rotational position signals and is further operable, in response thereto, to supply the actuator position commands to the brushless DC motors in a manner that commutates the brushless DC motors.

12. A flight control surface actuation system for aircraft having a first wing, a second wing, and plurality of flaps and slats on each wing, the system comprising:
a plurality of first flap actuators, each of the first flap actuators coupled to receive actuator position commands and operable, in response thereto, to move a flap on the first wing to a commanded flap position;
a plurality of second flap actuators, each of the second flap actuators coupled to receive actuator position commands and operable, in response thereto, to move a flap on the second wing to a commanded flap position;
a plurality of first slat actuators, each of the first slat actuators coupled to receive actuator position commands and operable, in response thereto, to move a slat on the first wing to a commanded slat position;
a plurality of second slat actuators, each of the second slat actuators coupled to receive actuator position commands and operable, in response thereto, to move a slat on the second wing to a commanded slat position;
a first flight control surface actuator control unit including a plurality of independent actuator control channels, one or more of the independent actuator control channels (i) coupled to both a first flap actuator and a first slat actuator and (ii) configured to selectively supply the actuator position commands thereto; and
a second flight control surface actuator control unit including a plurality of independent actuator control channels, one or more of the independent actuator control channels (i) coupled to both a second flap actuator and a second slat actuator and (ii) configured to selectively supply the actuator position commands thereto.

13. The system of claim 12, wherein the first and second flight control surface actuator control units are in operable communication and are each configured to selectively supply the actuator position commands in such a manner that at least selected ones of the first and second slats and at least selected ones of the first and second flaps are synchronously moved.

14. The system of claim 12, wherein:
the one or more independent actuator control channels in the first actuator control unit each comprise a switch operable to selectively couple the actuator position commands to either the first flap actuator or the first slat actuator; and
the one or more independent actuator control channels in the second actuator control unit each comprise a switch operable to selectively couple the actuator position commands to either the second flap actuator or the second slat actuator.

15. The system of claim 12, wherein the first and second flight control surface actuation control units are each adapted to receive flight control surface position commands and are each operable, in response thereto, to sequentially supply the actuator position commands to thereby sequentially move the first and second slat actuators and the first and second flap actuators to the commanded slat positions and flap positions, respectively.

16. The system of claim 12, further comprising:
a first plurality of slat position sensors, each of the first plurality of slat position sensors operable to supply a slat position signal representative of one the first slats to the first flight control surface actuator control unit;
a second plurality of slat position sensors, each of the second plurality of slat position sensors operable to supply a slat position signal representative of one the second slats to the second flight control surface actuator control unit;
a first plurality of flap position sensors, each of the first plurality of flap position sensors operable to supply a flap position signal representative of one of the first flaps to the first flight control surface actuator control unit; and
a second plurality of flap position sensors, each of the second plurality of flap position sensors operable to supply a flap position signal representative of one of the second flaps to the second flight control surface actuator control unit.

17. The system of claim 12, wherein:
the plurality of first slat actuators include at least an inboard first slat actuator and an outboard first slat actuator to thereby move an inboard slat on the first wing and an outboard slat on the first wing, respectively, to the commanded slat position;
the plurality of second slat actuators include at least an inboard second slat actuator and an outboard second slat actuator to thereby move an inboard slat on the second wing and an outboard slat on the second wing, respectively, to the commanded slat position;
the plurality of first flap actuators include at least an inboard first flap actuator and an outboard first flap actuator to thereby move an inboard flap on the first wing and an outboard flap on the first wing, respectively, to the commanded flap position;
the plurality of second flap actuators include at least an inboard second flap actuator and an outboard second flap actuator to thereby move an inboard flap on the second wing and an outboard flap on the second wing; respectively, to the commanded flap position;
the first actuator control unit is adapted to receive flight control surface position commands and is operable, in response thereto, to sequentially supply the actuator position commands to the inboard and outboard first slat actuators and to the inboard and outboard first flap actuators, to thereby sequentially move the inboard and outboard first slats to the commanded slat position and sequentially move the inboard and outboard first flaps to the commanded flap position; and the second actuator control unit is adapted to receive the flight control surface position commands and is operable, in response thereto, to sequentially supply the actuator position commands to the inboard and outboard second slat actuators and to the inboard and outboard second flap actuators, to thereby sequentially move the inboard and outboard second slats to the commanded slat position and sequentially move the inboard and outboard second flaps to the commanded flap position.

* * * * *